United States Patent
Yamamoto et al.

(10) Patent No.: US 7,412,219 B2
(45) Date of Patent: Aug. 12, 2008

(54) HIGH-FREQUENCY AMPLIFIER HAVING SIMPLE CIRCUIT STRUCTURE AND TELEVISION TUNER USING HIGH-FREQUENCY AMPLIFIER

(75) Inventors: Masaki Yamamoto, Fukushima-ken (JP); Masaaki Endo, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 491 days.

(21) Appl. No.: 11/263,766

(22) Filed: Oct. 27, 2005

(65) Prior Publication Data
US 2006/0094394 A1  May 4, 2006

(30) Foreign Application Priority Data
Nov. 4, 2004 (JP) ............... 2004-320796

(51) Int. Cl.
H04B 1/18 (2006.01)
H04B 1/16 (2006.01)
H03F 3/04 (2006.01)

(52) U.S. Cl. ............. 455/188.1; 455/194.2; 455/227; 330/302; 330/305

(58) Field of Classification Search ............. 455/188.1, 455/188.2, 194.2, 227, 252.1, 253.2; 330/302, 330/303, 305; 348/729, 731
See application file for complete search history.

(56) References Cited

U.S. PATENT DOCUMENTS 4,736,457 A * 4/1988 Kupfer .................... 455/188.1
4,757,276 A * 7/1988 Ishii et al. ................. 330/278
5,003,620 A * 3/1991 Tenjin ..................... 455/180.2
6,054,902 A * 4/2000 Masato ..................... 330/306
6,118,989 A * 9/2000 Abe et al. ................. 455/127.2
6,392,715 B1 * 5/2002 Sato et al. ................. 348/731
6,469,582 B2 * 10/2002 Forbes ..................... 330/303
6,903,783 B2 * 6/2005 Yamamoto ................. 348/731
6,999,740 B2 * 2/2006 Ogihara ................... 455/234.1
7,019,790 B2 * 3/2006 Yamamoto ................. 348/725

FOREIGN PATENT DOCUMENTS

| JP | 7-38404 | * 2/1995 |
| JP | 2000-224008 | 8/2000 |
| JP | 2001-320647 | 11/2001 |
| JP | 2002185877 | * 6/2002 |
| JP | 2002-368639 | 12/2002 |

* cited by examiner

*Primary Examiner*—Duc M Nguyen
(74) *Attorney, Agent, or Firm*—Brinks Hofer Gilson & Lione

(57) ABSTRACT

A high-frequency amplifier includes first and second amplifying stages disposed in parallel for amplifying VHF/UHF television signals. The first amplifying stage includes a first FET and a second FET of a grounded-gate type connected in series between a common input terminal and a first output terminal to which a VHF-signal selection circuit is connected, and the second amplifying stage includes a third FET and a fourth FET of a grounded-gate type connected in series between the common input terminal and a second output terminal to which a UHF-signal selection circuit is connected. Switching between amplifying operations of the first and second amplifying stages is performed by an operation switching unit selectively setting one of the first and third FETs in a forward-bias state and the other in a reverse-bias state in response to a switching voltage externally set.

5 Claims, 4 Drawing Sheets

HIGH-FREQUENCY AMPLIFIER HAVING SIMPLE CIRCUIT STRUCTURE AND TELEVISION TUNER USING HIGH-FREQUENCY AMPLIFIER

BACKGROUND OF THE INVENTION

1. Field of the Invention

The present invention relates to high-frequency amplifiers that are used in VHF/UHF television tuners, and in particular, relates to a high-frequency amplifier that amplifies received VHF/UHF television signals, includes a circuit that has a simple structure and is not large, and can achieve satisfactory amplifying characteristics.

2. Description of the Related Art

Hitherto, VHF/UHF television tuners have included a VHF tuning unit and a UHF tuning unit. The VHF tuning unit has included a first input-tuning circuit, a first high-frequency amplifier, a first interstage tuning circuit, a first local oscillator circuit, and a first mixer. The UHF tuning unit has included a second input-tuning circuit, a second high-frequency amplifier, a second interstage tuning circuit, a second local oscillator circuit, and a second mixer. The first and second input-tuning circuits divide received VHF/UHF television signals into VHF television signals and UHF television signals. The first and second high-frequency amplifiers amplify the VHF television signals and the UHF television signals, respectively. The first and second interstage tuning circuits tune in to the VHF television signals and the UHF television signals, respectively. The first mixer mixes the frequency of the VHF television signals with the frequency of first local oscillation signals output from the first local oscillator circuit, and the second mixer mixes the frequency of the UHF television signals with the frequency of second local oscillation signals output from the second local oscillator circuit.

FIG. 3 is a block diagram showing the structure of a typical known VHF/UHF television tuner. Such a VHF/UHF television tuner is disclosed in Japanese Unexamined Patent Application Publication No. 2000-224008.

As shown in FIG. 3, this VHF/UHF television tuner includes a VHF tuning unit 30V, a UHF tuning unit 30U, an antenna input terminal 31, an intermediate-frequency signal output terminal 32, and an automatic gain control (AGC) voltage input terminal 43. The VHF tuning unit 30V includes a first input-tuning circuit 33, a first high-frequency amplifier 35, a first interstage tuning circuit 37, a first mixer 39, and a first local oscillator circuit 41. The UHF tuning unit 30U includes a second input-tuning circuit 34, a second high-frequency amplifier 36, a second interstage tuning circuit 38, a second mixer 40, and a second local oscillator circuit 42. The first mixer 39 and the second mixer 40 constitute a tuner integrated circuit (IC).

The VHF/UHF television tuner having such a structure operates as follows.

When VHF television signals are supplied to the antenna input terminal 31, the first input-tuning circuit 33 selectively extracts the VHF television signals and supplies the extracted VHF television signals to the first high-frequency amplifier 35. The first high-frequency amplifier 35 amplifies the supplied VHF television signals to a predetermined signal level and supplies the amplified VHF television signals to the first interstage tuning circuit 37. The first interstage tuning circuit 37 removes unwanted frequency signals from the supplied VHF television signals and supplies the processed VHF television signals to the first mixer 39. The first mixer 39 mixes the frequency of the supplied VHF television signals with the frequency of first local oscillation signals output from the first local oscillator circuit 41 and outputs intermediate-frequency signals. The intermediate-frequency signals obtained in this way are supplied to a circuit in the next stage through the intermediate-frequency signal output terminal 32.

When UHF television signals are supplied to the antenna input terminal 31, the second input-tuning circuit 34 selectively extracts the UHF television signals and supplies the extracted UHF television signals to the second high-frequency amplifier 36. The second high-frequency amplifier 36 amplifies the supplied UHF television signals to a predetermined signal level and supplies the amplified UHF television signals to the second interstage tuning circuit 38. The second interstage tuning circuit 38 removes unwanted frequency signals from the supplied UHF television signals and supplies the processed UHF television signals to the second mixer 40. The second mixer 40 mixes the frequency of the supplied UHF television signals with the frequency of second local oscillation signals output from the second local oscillator circuit 42 and outputs intermediate-frequency signals. The intermediate-frequency signals obtained in this way are supplied to a circuit in the next stage through the intermediate-frequency signal output terminal 32.

Another type of VHF/UHF television tuner has been developed and is disclosed in, for example, Japanese Unexamined Patent Application Publication No. 2002-368639. This VHF/UHF television tuner includes a common integrated VHF/UHF television signal amplifier instead of including a VHF television signal amplifier and a UHF television signal amplifier separately. This common integrated VHF/UHF television signal amplifier has a simple structure and can be small.

The VHF/UHF television tuner disclosed in Japanese Unexamined Patent Application Publication No. 2002-368639 includes a common high-frequency amplifier composed of an integrated circuit that includes a VHF television signal amplifying stage and a UHF television signal amplifying stage. One of these stages is activated and the other is deactivated by selectively applying a switching signal.

FIG. 4 is a circuit diagram showing the structure of this common high-frequency amplifier provided in the VHF/UHF television tuner disclosed in Japanese Unexamined Patent Application Publication No. 2002-368639.

As shown in FIG. 4, this common high-frequency amplifier includes an integrated circuit 50. The integrated circuit 50 includes a first double-gate field-effect transistor (FET) 51 and a second double-gate FET 52, each transistor including a first gate (G1), a second gate (G2), a drain (D), and a source (S), a third FET 53 that includes a gate (G), a drain (D), and a source (S), four resistors 54 to 57, and eight terminals 50a to 50h. The common high-frequency amplifier further includes a VHF-input tuning circuit 58, a UHF-input tuning circuit 59, an antenna input terminal 60, a peaking coil 61, resistors 62 to 65, a diode 66, a power supply terminal 67, a switching-voltage supply terminal 68, and an AGC-voltage supply terminal 69, disposed outside the integrated circuit 50.

In the integrated circuit 50, the drain, source, and first and second gates of the first double-gate FET 51 are connected to the terminals 50h, 50g, 50a, and 50b, respectively. The drain, source, and first gate of the second double-gate FET 52 are connected to the terminals 50f, 50e, and 50d, respectively. The second gate of the second double-gate FET 52 is connected to the terminal 50b through the resistor 56. The drain and source of the third FET 53 are connected to the terminals 50c and 50g, respectively. The gate of the third FET 53 is connected to the terminal 50d through the resistor 57. The resistor 54 is connected to a portion between the first gate of the first double-gate FET 51 and the drain of the third FET 53.

The resistor 55 is connected to a portion between the sources of the first double-gate FET 51 and second double-gate FET 52.

Outside the integrated circuit 50, the input and output terminals of the VHF-input tuning circuit 58 are connected to the antenna input terminal 60 and the terminal 50a, respectively. In the UHF-input tuning circuit 59, the input terminal is connected to the antenna input terminal 60 through the diode 66, and the output terminal is connected to the terminal 50d. A series circuit that includes the peaking coil 61 and the resistor 62 is connected to a portion between the terminal 50d and the switching-voltage supply terminal 68. The resistor 63 is connected to a portion between the terminal 50b and the AGC-voltage supply terminal 69. The resistor 64 is connected to a portion between the terminal 50c and the power supply terminal 67. The resistor 65 is connected to a portion between the terminal 50c and the input terminal of the UHF-input tuning circuit 59.

The common high-frequency amplifier, which has the structure described above, in the VHF/UHF television tuner operates as follows.

When a high-level switching voltage is supplied to the switching-voltage supply terminal 68, this switching voltage is applied to the first gate of the second double-gate FET 52 and the gate of the third FET 53. Thus, the second double-gate FET 52 is activated, and the third FET 53 is turned on. When the third FET 53 is turned on, the drain voltage of the third FET 53 is decreased close to zero, and the decreased voltage is applied to the cathode of the diode 66 and the diode 66 is turned on. Thus, television signals supplied to the antenna input terminal 60 are supplied to the UHF-input tuning circuit 59. Then, the UHF-input tuning circuit 59 selects UHF television signals from the supplied television signals, and the second double-gate FET 52 amplifies the selected UHF television signals. In this case, since the resistor 57 is connected to a portion between the first gate of the second double-gate FET 52 and the gate of the third FET 53, the UHF television signals are not supplied to the third FET 53. Moreover, an AGC voltage is supplied to the second gate of the second double-gate FET 52 from the AGC-voltage supply terminal 69 to control a signal gain in the second double-gate FET 52. At this time, the voltage of the first gate of the first double-gate FET 51 is decreased close to zero. Thus, the first double-gate FET 51 is deactivated and thus does not amplify VHF television signals.

On the other hand, when a low-level switching voltage is supplied to the switching-voltage supply terminal 68, this switching voltage is applied to the first gate of the second double-gate FET 52 and the gate of the third FET 53. Thus, the second double-gate FET 52 is deactivated, and the third FET 53 is turned off. When the third FET 53 is turned off, the drain voltage of the third FET 53 is increased close to a power-supply voltage, and the increased voltage is applied to the first gate of the first double-gate FET 51 and the cathode of the diode 66. Thus, the first double-gate FET 51 is activated, and the diode 66 is turned off. Accordingly, television signals supplied to the antenna input terminal 60 are supplied only to the VHF-input tuning circuit 58. Then, the VHF-input tuning circuit 58 selects VHF television signals from the supplied television signals, and the first double-gate FET 51 amplifies the selected VHF television signals. In this case, since the resistor 54 is connected to a portion between the first gate of the first double-gate FET 51 and the drain of the third FET 53, leakage of the VHF television signals through stray capacitance in the third FET 53 does not occur.

The VHF/UHF television tuner disclosed in Japanese Unexamined Patent Application Publication No. 2000-224008 includes the VHF tuning unit 30V and the UHF tuning unit 30U. The VHF tuning unit 30V includes the first input-tuning circuit 33, the first high-frequency amplifier 35, the first interstage tuning circuit 37, the first mixer 39, and the first local oscillator circuit 41. The UHF tuning unit 30U includes the second input-tuning circuit 34, the second high-frequency amplifier 36, the second interstage tuning circuit 38, the second mixer 40, and the second local oscillator circuit 42. Thus, the number of components is large. As a result, the size of the VHF/UHF television tuner is inevitably large, and the manufacturing cost is high.

On the other hand, in the common high-frequency amplifier provided in the VHF/UHF television tuner disclosed in Japanese Unexamined Patent Application Publication No. 2002-368639, the amplifier part of the VHF/UHF television tuner is a VHF/UHF dual amplifier. Thus, the size of the VHF/UHF television tuner can be decreased, and the manufacturing cost can be reduced. However, when an external circuit is connected to the common high-frequency amplifier, amplifying characteristics of the common high-frequency amplifier, to which the external circuit is connected, are not necessarily satisfactory.

SUMMARY OF THE INVENTION

In view of the technological background described above, it is an object of the present invention to provide a high-frequency amplifier that includes a circuit that has a simple structure, and is not large, and can achieve satisfactory amplifying characteristics and low manufacturing cost.

To achieve the object described above, a high-frequency amplifier according to the present invention includes a first amplifying stage and a second amplifying stage that are disposed in parallel and that amplify VHF/UHF television signals received through an antenna. The first amplifying stage includes a first FET and a second FET that are of a grounded-gate type and that are connected in series between a common input terminal and a first output terminal to which a VHF-signal selection circuit is connected, and the second amplifying stage includes a third FET and a fourth FET that are of a grounded-gate type and that are connected in series between the common input terminal and a second output terminal to which a UHF-signal selection circuit is connected. Switching between amplifying operations of the first and second amplifying stages is performed by an operation switching unit selectively setting one of the first and third FETs in a forward-bias state and the other in a reverse-bias state in response to a switching voltage that is externally set.

The operation switching unit may include a bias-state switching transistor, a base of the bias-state switching transistor being connected to a gate of the third FET, a collector of the bias-state switching transistor being connected to a gate of the first FET and a power-supply circuit, and an emitter of the bias-state switching transistor being connected to the common input terminal, and a switching-voltage supply circuit that is connected to the gate of the third FET and that supplies a ground voltage in a case where the amplifying operation of the first amplifying stage is selected and supplies a positive voltage in a case where the amplifying operation of the second amplifying stage is selected.

A gain control voltage may be supplied to a gate of the second FET in the first amplifying stage and a gate of the fourth FET in the second amplifying stage, and a signal gain in the first or second amplifying stage selected for the amplifying operation may be controlled by the supplied gain control voltage.

The high-frequency amplifier may further include a PIN diode that is connected in series to a portion between the common input terminal and individual sources of the first and third FETs so that a source current of the first or third FET flows through the PIN diode to control an impedance in the PIN diode.

A VHF/UHF television tuner includes the high-frequency amplifier according to the present invention serving as a preliminary amplifier, the VHF-signal selection circuit, which includes a VHF double-tuned circuit and is connected to an output side of the high-frequency amplifier, the UHF-signal selection circuit, which includes a UHF double-tuned circuit and is connected to the output side of the high-frequency amplifier, a VHF amplifier that is connected to an output side of the VHF double-tuned circuit and that amplifies VHF television signals, a first mixer that is connected to the output side of the VHF double-tuned circuit and that converts the amplified VHF television signals to first intermediate-frequency signals, a UHF amplifier that is connected to an output side of the UHF double-tuned circuit and that amplifies UHF television signals, and a second mixer that is connected to the output side of the UHF double-tuned circuit and that converts the amplified UHF television signals to second intermediate-frequency signals.

In the high-frequency amplifier according to the present invention, the first and second amplifying stages disposed in parallel amplify VHF/UHF television signals. The first amplifying stage includes the first and second FETs that are of a grounded-gate type and that are connected in series between the common input terminal and the first output terminal, and the second amplifying stage includes the third and fourth FETs that are of a grounded-gate type and that are connected in series between the common input terminal and the second output terminal. The VHF-signal selection circuit is connected to the first output terminal and selects VHF television signals, and the UHF-signal selection circuit is connected to the second output terminal and selects UHF television signals. In this high-frequency amplifier, signal gains in the first and second amplifying stages can be kept relatively high, a high output impedance can be achieved by a low input impedance, and satisfactory selection characteristics of the VHF-signal selection circuit and the UHF-signal selection circuit can be achieved. Moreover, the whole structure of the circuit is simple and the circuit is not large, and satisfactory amplifying characteristics and low manufacturing cost can be achieved.

In the high-frequency amplifier according to the present invention, switching between the amplifying operations of the first and second amplifying stages is performed by the operation switching unit selectively activating or deactivating the first or third FET. Thus, the circuit structure of the operation switching unit can be simple. Moreover, since switching between the amplifying operations of the first and second amplifying stages can be reliably performed, unwanted signal components are not transmitted through a deactivated amplifying stage.

Furthermore, in the high-frequency amplifier according to the present invention, signal gains in the first and second amplifying stages are controlled by supplying an AGC voltage to the gates of the second and fourth FETs. Thus, signal gains in the first and second amplifying stages can be controlled without AGC circuits separately provided in the first and second amplifying stages.

Furthermore, in the high-frequency amplifier according to the present invention, the PIN diode is connected in series to the sources of the first and third FETs, the source currents of the first and third FETs flowing through the PIN diode, and an impedance in the PIN diode is controlled by the source currents. When signal gains in the first and second amplifying stages are increased by an AGC voltage, the source currents through the first and third FETs increase, and an impedance in the PIN diode decreases. On the other hand, when gains in the first and second amplifying stages are decreased by an AGC voltage, the source currents through the first and third FETs decrease, and an impedance in the PIN diode increases. Thus, AGC functions can be facilitated.

In the VHF/UHF television tuner that includes the high-frequency amplifier according to the present invention, individual output impedances in the first and second amplifying stages in the high-frequency amplifier are high. Thus, satisfactory selection characteristics of the VHF double-tuned circuit and the UHF double-tuned circuit respectively connected to output sides of the first and second amplifying stages can be achieved.

DESCRIPTION OF THE PREFERRED EMBODIMENTS

An embodiment according to the present invention will now be described with reference to the drawings.

Figure 1:
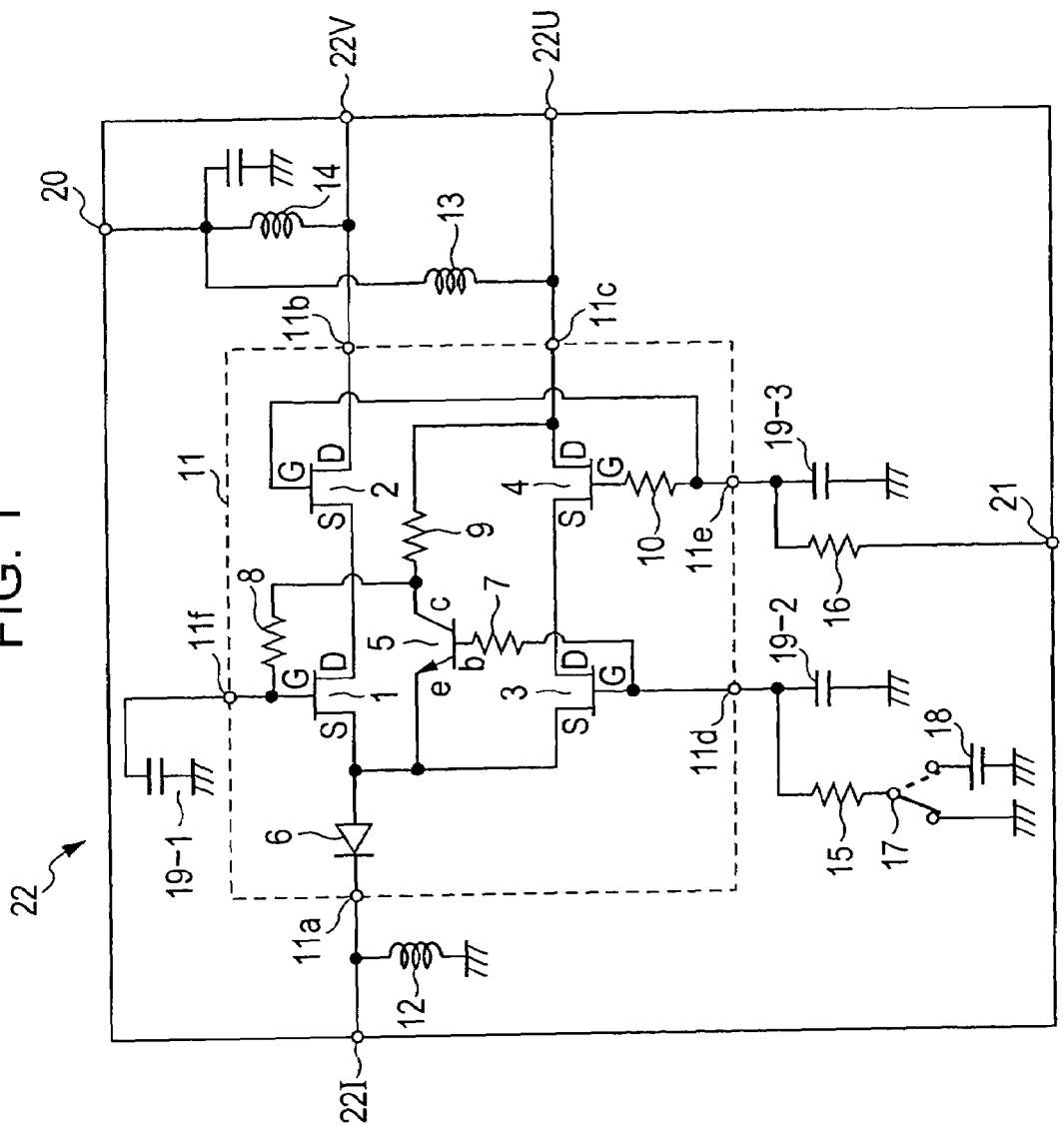
FIG. 1 is a circuit diagram showing the structure of a main part of a high-frequency amplifier according to an embodiment of the present invention.

FIG. 1 is a circuit diagram showing the structure of a main part of a high-frequency amplifier 22 according to the embodiment of the present invention.

As shown in FIG. 1, the high-frequency amplifier 22 according to this embodiment includes an integrated circuit 11. The integrated circuit 11 includes a first FET 1, a second FET 2, a third FET 3, a fourth FET 4, each FET including a gate (G), a drain (D), and a source (S), a bipolar transistor 5 that includes a collector (C), an emitter (E), and a base (B), a PIN diode 6, resistors 7 to 10, and six terminals 11a to 11f. In the integrated circuit 11, a circuit segment that includes the first FET 1 and the second FET 2 constitutes a first amplifying stage, and a circuit segment that includes the third FET 3 and the fourth FET 4 constitutes a second amplifying stage.

The high-frequency amplifier 22 further includes inductors 12 to 14, resistors 15 and 16, a change-over switch 17, a bias supply 18, bypass capacitors 19-1, 19-2, and 19-3, a power supply terminal 20, an AGC-voltage supply terminal 21, a television-signal input terminal 22I to which television signals are input, a first output terminal 22V that outputs VHF television signals, and a second output terminal 22U that outputs UHF television signals, disposed outside the integrated circuit 11. In this case, a circuit segment that includes the bipolar transistor 5 in the integrated circuit 11 and a circuit segment that includes the resistor 15, the change-over switch 17, and the bias supply 18 outside the integrated circuit 11 constitute an operation switching unit.

In the integrated circuit 11, the drain of the first FET 1 is connected to the source of the second FET 2, the source of the first FET 1 is connected to the source of the third FET 3, the emitter of the bipolar transistor 5, and the anode of the PIN diode 6, the gate of the first FET 1 is connected to the power supply terminal 20 through the resistors 8 and 9 and the inductor 13. The drain and gate of the second FET 2 are connected to the terminals 11b and 11e, respectively. The drain and gate of the third FET 3 are connected to the source of the fourth FET 4 and the terminal 11d, respectively. The drain of the fourth FET 4 is connected to the terminal 11c, and the gate of the fourth FET 4 is connected to the terminal 11e through the resistor 10. The collector of the bipolar transistor 5 is connected to the gate of the first FET 1 and the terminal 11f through the resistor 8 and to the drain of the fourth FET 4 and the terminal 11c through the resistor 9, and the base of the bipolar transistor 5 is connected to the gate of the third FET 3 and the terminal 11d through the resistor 7. The cathode of the PIN diode 6 is connected to the terminal 11a.

Outside the integrated circuit 11, one end of the inductor 12 is connected to the television-signal input terminal 22I and the terminal 11a, and the other end is connected to the ground. One end of the inductor 13 is connected to the power supply terminal 20, and the other end is connected to the second output terminal 22U and the terminal 11c. One end of the inductor 14 is connected to the power supply terminal 20, and the other end is connected to the first output terminal 22V and the terminal 11b. One end of the resistor 15 is connected to the terminal 11d, and the other end is connected to the traveling contact of the change-over switch 17. One end of the resistor 16 is connected to the terminal 11e, and the other end is connected to the AGC-voltage supply terminal 21. One fixed contact of the change-over switch 17 is connected to the ground, and the other fixed contact is connected to the ground through the bias supply 18. The bypass capacitor 19-1 is connected to a portion between the terminal 11f and the ground. The bypass capacitor 19-2 is connected to a portion between the terminal 11d and the ground. The bypass capacitor 19-3 is connected to a portion between the terminal 11e and the ground.

The high-frequency amplifier 22 according to this embodiment operates as follows.

In the high-frequency amplifier 22, in order to activate the first amplifying stage, the traveling contact of the change-over switch 17 is connected to the one fixed contact to supply a ground voltage to the terminal 11d. At this time, this ground voltage is applied to the gate of the third FET 3 and the base of the bipolar transistor 5. Thus, the third FET 3 is deactivated, and the bipolar transistor 5 is turned off. When the bipolar transistor 5 is turned off, a power-supply voltage supplied from the power supply terminal 20 to the terminal 11c through the inductor 13 is applied to the gate of the first FET 1 through the resistors 9 and 8, and the first FET 1 is activated. At the same time, the power-supply voltage supplied from the power supply terminal 20 to the terminal 11b through the inductor 14 is applied to the drain of the second FET 2. Thus, the second FET 2 in addition to the first FET 1 is activated, thereby activating the first amplifying stage. On the other hand, although the power-supply voltage supplied from the power supply terminal 20 to the terminal 11c through the inductor 13 is applied to the drain of the fourth FET 4, the second amplifying stage is deactivated because the third FET 3 is deactivated. Thus, the activated first amplifying stage amplifies VHF/UHF television signals supplied to the television-signal input terminal 22I, and the amplified VHF/UHF television signals are supplied to a VHF double-tuned circuit in the next stage through the first output terminal 22V. The VHF double-tuned circuit selectively extracts VHF television signals from the supplied VHF/UHF television signals.

Moreover, in the high-frequency amplifier 22, in order to activate the second amplifying stage, the traveling contact of the change-over switch 17 is connected to the other fixed contact to supply a bias voltage from the bias supply 18 to the terminal 11d. At this time, this bias voltage is applied to the gate of the third FET 3 and the base of the bipolar transistor 5. Thus, the third FET 3 is activated, and the bipolar transistor 5 is turned on. When the bipolar transistor 5 is turned on, a power-supply voltage supplied from the power supply terminal 20 to the terminal 11c through the inductor 13 flows into a ground point through the resistor 9, the bipolar transistor 5, the PIN diode 6, and the inductor 12. Thus, the collector voltage of the bipolar transistor 5 becomes close to the ground voltage, and this voltage close to the ground voltage is applied to the gate of the first FET 1 through the resistor 8 and the first FET 1 is deactivated. At the same time, the power-supply voltage supplied from the power supply terminal 20 to the terminal 11c through the inductor 13 is applied to the drain of the fourth FET 4. Thus, the fourth FET 4 in addition to the third FET 3 is activated, thereby activating the second amplifying stage. On the other hand, although the power-supply voltage supplied from the power supply terminal 20 to the terminal 11b through the inductor 14 is applied to the drain of the second FET 2, the first amplifying stage is deactivated because the first FET 1 is deactivated. Thus, the activated second amplifying stage amplifies VHF/UHF television signals supplied to the television-signal input terminal 22I, and the amplified VHF/UHF television signals are supplied to a UHF double-tuned circuit in the next stage through the second output terminal 22U. The UHF double-tuned circuit selectively extracts UHF television signals from the supplied VHF/UHF television signals.

When the first or second amplifying stage is activated, an AGC voltage output from an AGC-voltage generating circuit (not shown) is supplied to the AGC-voltage supply terminal 21. The supplied AGC voltage is applied to the gate of the second FET 2 in the activated first amplifying stage or the gate of the fourth FET 4 in the activated second amplifying stage, and a signal gain in the first or second amplifying stage is controlled according to the magnitude of the supplied AGC voltage in a known way.

That is to say, in a state in which the first amplifying stage is activated, when the amplitude of television signals supplied to the television-signal input terminal 22I is large, an AGC voltage supplied to the AGC-voltage supply terminal 21 is decreased according to the amplitude of the television signals to decrease the current that flows between the drain and source of each of the first FET 1 and the second FET 2, thereby decreasing a signal gain in the first amplifying stage. On the other hand, when the amplitude of television signals supplied to the television-signal input terminal 22I is small, an AGC voltage supplied to the AGC-voltage supply terminal 21 is increased according to the amplitude of the television signals to increase the current that flows between the drain and source of each of the first FET 1 and the second FET 2, thereby increasing a signal gain in the first amplifying stage.

Similarly, in a state in which the second amplifying stage is activated, when the amplitude of television signals supplied to the television-signal input terminal 22I is large, an AGC voltage supplied to the AGC-voltage supply terminal 21 is decreased according to the amplitude of the television signals to decrease the current that flows between the drain and source of each of the third FET 3 and the fourth FET 4, thereby decreasing a signal gain in the second amplifying stage. On the other hand, when the amplitude of television signals supplied to the television-signal input terminal 22I is small, an AGC voltage supplied to the AGC-voltage supply terminal 21 is increased according to the amplitude of the television signals to increase the current that flows between the drain and source of each of the third FET 3 and the fourth FET 4, thereby increasing a signal gain in the second amplifying stage.

When the current that flows between the drain and source of each of the first FET 1 and the second FET 2 or the current that flows between the drain and source of each of the third FET 3 and the fourth FET 4 decreases, that is to say, when a signal gain in the first or second amplifying stage decreases, the current that flows through the PIN diode 6, which is connected in series to the sources of the first FET 1 and the third FET 3, also decreases. Thus, an impedance in the PIN diode 6 increases. That is to say, signal loss through the PIN diode 6 increases. On the other hand, when the current that flows between the drain and source of each of the first FET 1 and the second FET 2 or the current that flows between the drain and source of each of the third FET 3 and the fourth FET 4 increases, that is to say, when a signal gain in the first or second amplifying stage increases, the current that flows through the PIN diode 6 also increases. Thus, an impedance in the PIN diode 6 decreases. That is to say, signal loss through the PIN diode 6 decreases. In this way, an increase or decrease in a signal gain based on an AGC voltage can be facilitated by disposing the PIN diode 6 in the path of the current that flows between the drain and source.

Figure 2:
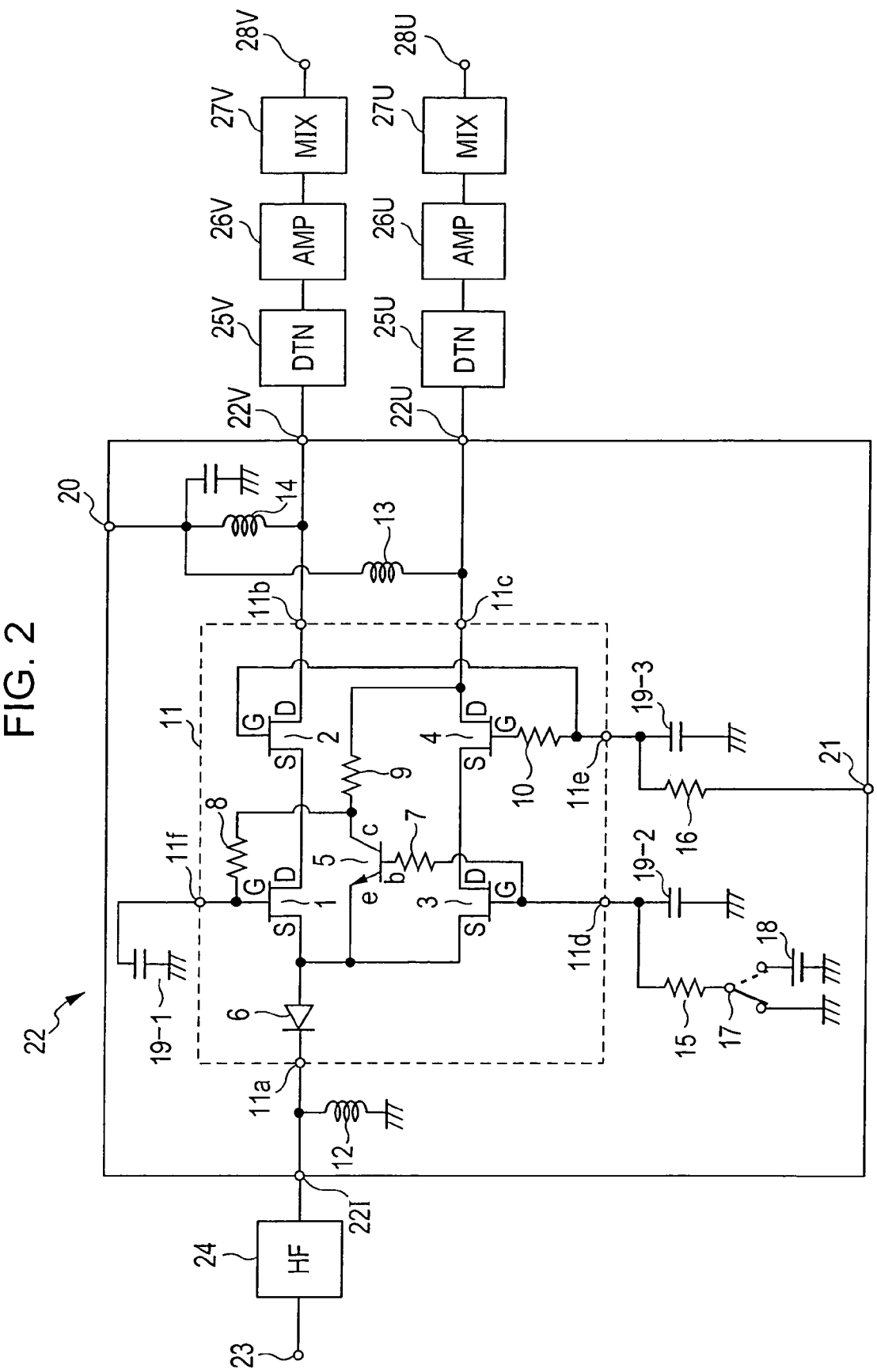
FIG. 2 is a block diagram showing the structure of a main part of a VHF/UHF television tuner that uses the high-frequency amplifier shown in FIG. 1.
Figure 3:
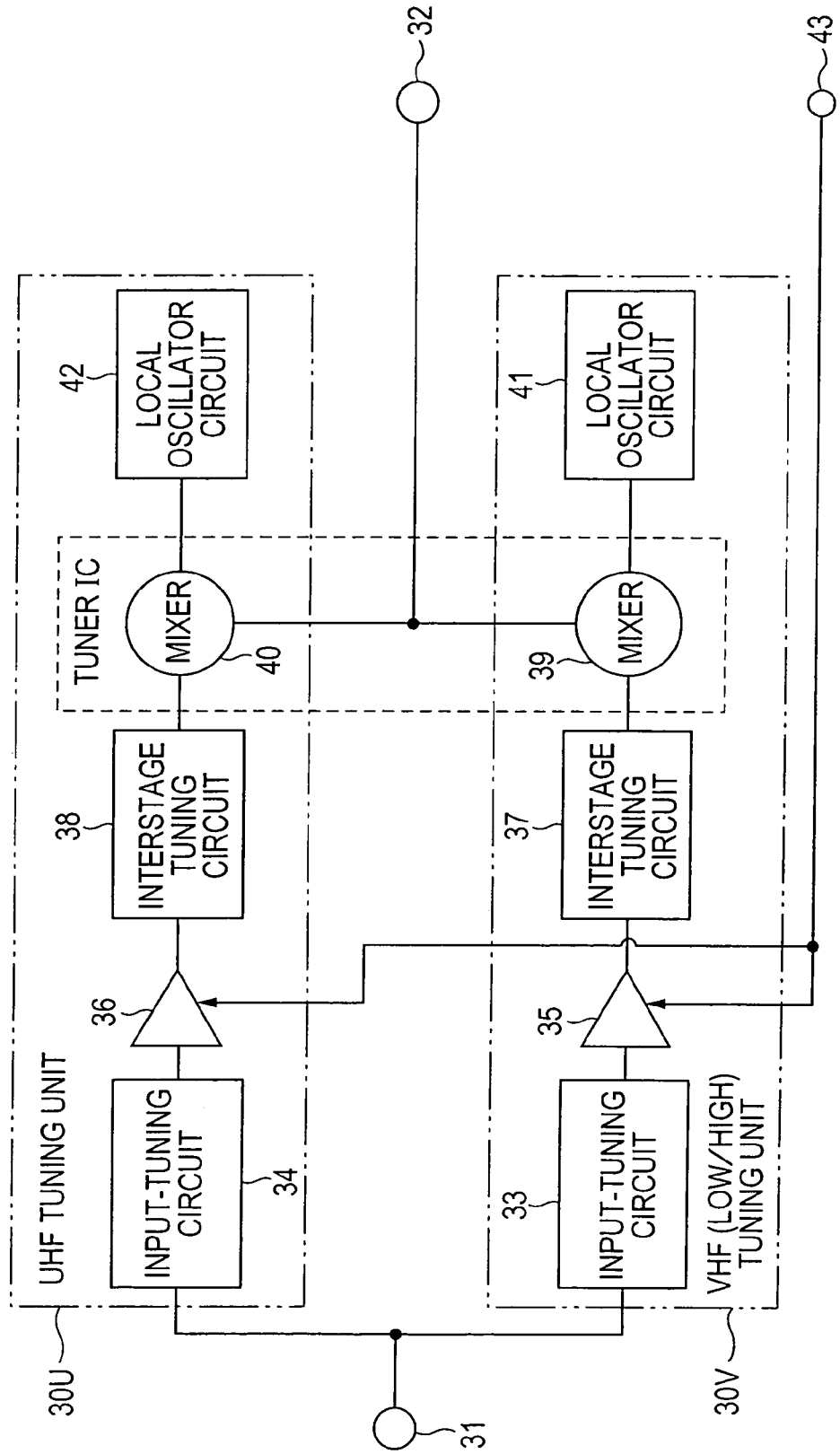
FIG. 3 is a block diagram showing the structure of a typical known VHF/UHF television tuner.
Figure 4:
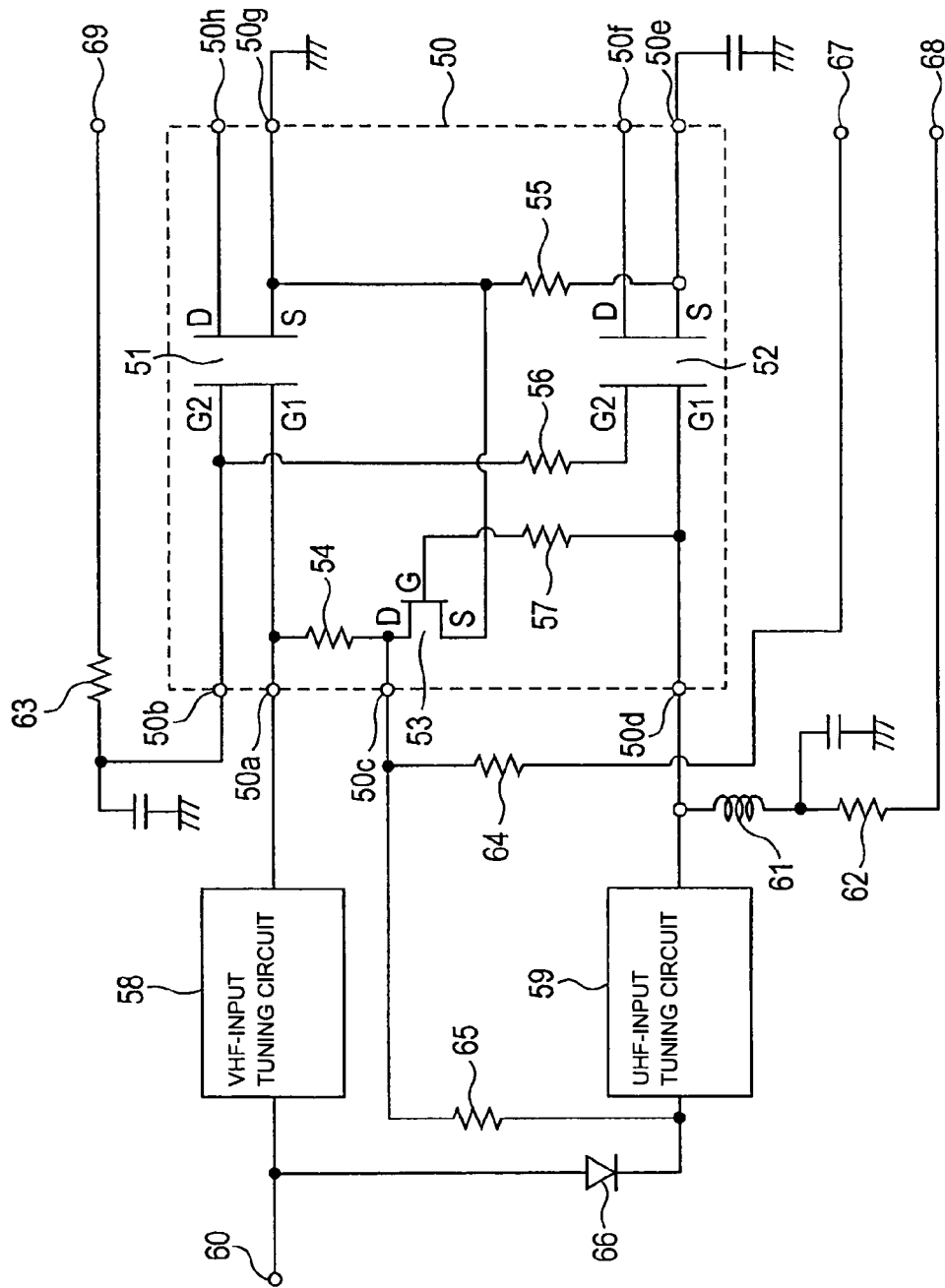
FIG. 4 is a circuit diagram showing the structure of a common high-frequency amplifier provided in another known VHF/UHF television tuner.

FIG. 2 is a block diagram showing the structure of a main part of a VHF/UHF television tuner that uses the high-frequency amplifier 22 shown in FIG. 1. In FIG. 2, the same reference numerals as in FIG. 1 are assigned to corresponding components.

As shown in FIG. 2, this VHF/UHF television tuner includes the high-frequency amplifier 22 shown in FIG. 1, an antenna input terminal 23, a high-pass filter (HF) 24, a VHF double-tuned circuit (DTN) 25V, a UHF double-tuned circuit (DTN) 25U, a VHF amplifier (AMP) 26V, a UHF amplifier (AMP) 26U, a VHF mixer (MIX) 27V, a UHF mixer (MIX) 27U, a first intermediate-frequency signal output terminal 28V, and a second intermediate-frequency signal output terminal 28U. A first circuit segment constitutes a VHF tuning unit. The first circuit segment includes the first amplifying stage in the high-frequency amplifier 22, the VHF double-tuned circuit 25V, the VHF amplifier 26V, the VHF mixer 27V, and the first intermediate-frequency signal output terminal 28V. A second circuit segment constitutes a UHF tuning unit. The second circuit segment includes the second amplifying stage in the high-frequency amplifier 22, the UHF double-tuned circuit 25U, the UHF amplifier 26U, the UHF mixer 27U, and the second intermediate-frequency signal output terminal 28U.

The operation of the VHF/UHF television tuner according to this embodiment will now be described.

The operation in a state in which the first amplifying stage in the high-frequency amplifier 22 is activated will be described first.

When VHF/UHF television signals are supplied to the antenna input terminal 23, the high-pass filter 24 removes unwanted signal components from the supplied television signals and supplies the processed television signals to the high-frequency amplifier 22. The high-frequency amplifier 22 amplifies the input television signals in the first amplifying stage and supplies the amplified television signals to the VHF double-tuned circuit 25V in the next stage through the first output terminal 22V. The VHF double-tuned circuit 25V selectively extracts VHF television signals from the input television signals and supplies the extracted VHF television signals to the VHF amplifier 26V. The VHF amplifier 26V amplifies the supplied VHF television signals to a predetermined signal level and supplies the amplified VHF television signals to the VHF mixer 27V. The VHF mixer 27V mixes the frequency of the supplied VHF television signals with the frequency of local oscillation signals output from a VHF local oscillator (not shown) to generate first intermediate-frequency signals. The generated first intermediate-frequency signals are supplied to a circuit in the next stage through the first intermediate-frequency signal output terminal 28V.

Next, the operation in a state in which the second amplifying stage in the high-frequency amplifier 22 is activated will be described.

When VHF/UHF television signals are supplied to the antenna input terminal 23, the high-pass filter 24 removes unwanted signal components from the supplied television signals and supplies the processed television signals to the high-frequency amplifier 22. The high-frequency amplifier 22 amplifies the input television signals in the second amplifying stage and supplies the amplified television signals to the UHF double-tuned circuit 25U in the next stage through the second output terminal 22U. The UHF double-tuned circuit 25U selectively extracts UHF television signals from the input television signals and supplies the extracted UHF television signals to the UHF amplifier 26U. The UHF amplifier 26U amplifies the supplied UHF television signals to a predetermined signal level and supplies the amplified UHF television signals to the UHF mixer 27U. The UHF mixer 27U mixes the frequency of the supplied UHF television signals with the frequency of local oscillation signals output from a UHF local oscillator (not shown) to generate second intermediate-frequency signals. The generated second intermediate-frequency signals are supplied to a circuit in the next stage through the second intermediate-frequency signal output terminal 28U.

What is claimed is:

1. A high-frequency amplifier comprising:
   a first amplifying stage and a second amplifying stage that are disposed in parallel and that amplify VHF/UHF television signals received through an antenna,
   the first amplifying stage comprising:
   a first FET and a second FET that are of a grounded-gate type and that are connected in series between a common input terminal and a first output terminal to which a VHF-signal selection circuit is connected, and
   the second amplifying stage comprising:
   a third FET and a fourth FET that are of a grounded-gate type and that are connected in series between the common input terminal and a second output terminal to which a UHF-signal selection circuit is connected,
   wherein switching between amplifying operations of the first and second amplifying stages is performed by an operation switching unit selectively setting one of the first and third FETs in a forward-bias state and the other of the first and third FETs in a reverse-bias state in response to a switching voltage that is externally set.

2. The high-frequency amplifier according to claim 1, wherein the operation switching unit comprises:
   a bias-state switching transistor, a base of the bias-state switching transistor being connected to a gate of the third FET, a collector of the bias-state switching transistor being connected to a gate of the first FET and a power-supply circuit, and an emitter of the bias-state switching transistor being connected to the common input terminal; and
   a switching-voltage supply circuit that is connected to the gate of the third FET and that supplies a ground voltage in a case where the amplifying operation of the first amplifying stage is selected and supplies a positive voltage in a case where the amplifying operation of the second amplifying stage is selected.

3. The high-frequency amplifier according to claim 1, wherein a gain control voltage is supplied to a gate of the second FET in the first amplifying stage and a gate of the fourth FET in the second amplifying stage, and a signal gain in the first or second amplifying stage selected for the amplifying operation is controlled by the supplied gain control voltage.

4. The high-frequency amplifier according to claim 1, further comprising a PIN diode that is connected in series to a portion between the common input terminal and individual sources of the first and third FETs so that a source current of the first or third FET flows through the PIN diode to control an impedance in the PIN diode.

5. A VHF/UHF television tuner comprising:
the high-frequency amplifier according to claim 1 serving as a preliminary amplifier;
a VHF-signal selection circuit, which includes a VHF double-tuned circuit and is connected to an output side of the high-frequency amplifier;
a UHF-signal selection circuit, which includes a UHF double-tuned circuit and is connected to the output side of the high-frequency amplifier;
a VHF amplifier that is connected to an output side of the VHF double-tuned circuit and that amplifies VHF television signals;
a first mixer that is connected to the output side of the VHF double-tuned circuit and that converts the amplified VHF television signals to first intermediate-frequency signals;
a UHF amplifier that is connected to an output side of the UHF double-tuned circuit and that amplifies UHF television signals; and
a second mixer that is connected to the output side of the UHF double-tuned circuit and that converts the amplified UHF television signals to second intermediate-frequency signals.

* * * * *